(12) United States Patent
Ramalingam et al.

(10) Patent No.: US 10,260,862 B2
(45) Date of Patent: Apr. 16, 2019

(54) POSE ESTIMATION USING SENSORS

(71) Applicant: Mitsubishi Electric Research Laboratories, Inc., Cambridge, MA (US)

(72) Inventors: Srikumar Ramalingam, Cambridge, MA (US); Jay Thornton, Watertown, MA (US); Wenzhen Yuan, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 309 days.

(21) Appl. No.: 14/929,517

(22) Filed: Nov. 2, 2015

(65) Prior Publication Data

US 2017/0124693 A1    May 4, 2017

(51) Int. Cl.
| | |
|---|---|
| *G06T 7/70* | (2017.01) |
| *G06T 7/73* | (2017.01) |
| *G01B 11/14* | (2006.01) |
| *G01B 21/24* | (2006.01) |
| *G06T 15/20* | (2011.01) |
| *G06T 17/00* | (2006.01) |
| *G06T 7/246* | (2017.01) |

(52) U.S. Cl.
CPC ............. *G01B 11/14* (2013.01); *G01B 21/24* (2013.01); *G06T 7/251* (2017.01); *G06T 7/70* (2017.01); *G06T 7/75* (2017.01); *G06T 15/20* (2013.01); *G06T 17/00* (2013.01); *G06T 2200/04* (2013.01); *G06T 2207/10032* (2013.01); *G06T 2207/30184* (2013.01); *G06T 2207/30244* (2013.01); *G06T 2207/30252* (2013.01)

(58) Field of Classification Search
CPC .................................. G01B 11/14; G06T 7/75
See application file for complete search history.

(56) References Cited

U.S. PATENT DOCUMENTS

| | | | | |
|---|---|---|---|---|
| 2001/0043738 | A1* | 11/2001 | Sawhney | ................ G01S 5/163 |
| | | | | 382/154 |
| 2006/0023228 | A1* | 2/2006 | Geng | ..................... A61B 5/411 |
| | | | | 356/601 |
| 2010/0034423 | A1* | 2/2010 | Zhao | .................. G06K 9/00785 |
| | | | | 382/103 |
| 2010/0166294 | A1* | 7/2010 | Marrion | ............. G06K 9/00214 |
| | | | | 382/154 |

(Continued)

FOREIGN PATENT DOCUMENTS

EP    2795580 A1    10/2014

OTHER PUBLICATIONS

Wenzhen Yuan et al. "Fast localization and tracking using event sensors," 2016 IEEE International Conference on Robotics and Automation, IEEE May 16, 2106. pp. 4564-4571.

(Continued)

*Primary Examiner* — Tracy Y. Li
(74) *Attorney, Agent, or Firm* — Gennadiy Vinokur; James McAleenan; Hironori Tsukamoto

(57) ABSTRACT

A method and system estimates a three-dimensional (3D) pose of a sensor by first acquiring scene data of a 3D scene by the sensor. Two-dimensional (2D) lines are detected in the scene data and the 2D lines are matched to 3D lines of a 3D model of the scene to produce matching lines. Then, the 3D pose of the sensor is estimated using the matching lines.

11 Claims, 4 Drawing Sheets

(56) References Cited

U.S. PATENT DOCUMENTS

| | | | | |
|---|---|---|---|---|
| 2010/0277572 | A1* | 11/2010 | Nakamura | H04N 13/0221 348/50 |
| 2011/0206274 | A1* | 8/2011 | Tateno | G06T 7/75 382/154 |
| 2013/0038694 | A1* | 2/2013 | Nichani | G06T 7/20 348/46 |
| 2013/0100250 | A1* | 4/2013 | Raskar | H04N 13/02 348/46 |
| 2014/0354537 | A1 | 12/2014 | Park et al. | |
| 2014/0368645 | A1* | 12/2014 | Ahuja | G06T 7/0044 348/143 |
| 2015/0160737 | A1 | 6/2015 | Jeong et al. | |
| 2015/0181198 | A1* | 6/2015 | Baele | H04N 13/0246 348/46 |

OTHER PUBLICATIONS

Li Chee Ming Julien et al. "Determination of UAS Trajectory in a Known Environment from FPV Video," International Archives of the Photogrammetry, Remote sensing and spatial information sciences. vol. 40, No. 1W2, Sep. 4, 2013. pp. 247-252.

Clemens Arth et al. "Instant outdoor localization and SLAM Initialization from 2.5D Maps," IEEE transactions on Visualization and Computer Graphics. vol. 21, No. 11. Sep. 29, 2015. pp. 1309-1318.

Williams et al. "Hybrid Tracking using Gravity Aligned Edges," Proceedings of the 14th Annual ACM SIGHI_NZ Conference on Computer Human Interaction, Chinz Jan. 1, 2013. pp. 1-8.

Mueggler et al. "Event-based, 6-DOF pose tracking for high speed maneuvers," 2014 IEEE RSJ International Conference on iintelligent robots ans systems, IEEE, Sep. 14, 2014. pp. 2761-2768.

Censi et al., "Low-latency event-based visual odometry," ICRA, 2014.

Weikersdorfer et al., "Simultaneous localization and mapping for event-based vision systems," Computer Vision Systems, 2013.

Delbruck et al., "A silicon early visual system as a model animal," Vision Research, 2004.

Carneiro et al., "Event-based 3D reconstruction from neuromorphic retinas," Neural Networks, 2013.

Benosman et al., "Asynchronous event-based Hebbian epipolar geometry," IEEE Trans. Neural Network, 2011.

Mahony et al., "Nonlinear complementary filters on the special orthogonal group," Automatic Control, IEEE Transactions on, 53(5):1203-1218, 2008.

* cited by examiner

POSE ESTIMATION USING SENSORS

FIELD OF THE INVENTION

The invention is generally related to computer vision, and more particularly to estimating a pose of a sensor.

BACKGROUND OF THE INVENTION

Conventional cameras generally observe a scene as a sequence of images acquired at a fixed frame rate. This image-based representation is an inefficient and redundant encoding of the scene that wastes power, memory, and time. Because the exposure time for each image is the same, this can also lead to difficulties in imaging scenes that have a high dynamic range, i.e., scenes containing very dark and very bright regions.

Dynamic vision sensors (DVS) sensors are different from conventional cameras. DVS do not output actual pixel intensity values. Instead, DVS signal pixel-level changes, i.e., whether the intensity of a pixel increases or decreases. DVS are inspired by a model of the human retina, see Delbruck et al., "A silicon early visual system as a model animal," Vision Research, 2004. These sensors do not send entire images at fixed frame rates. Instead, DVS only send pixel-level changes as 0 and 1 binary events, similar to signals from retinal ganglion cells, at exactly the time the changes occur. For example, a 0 indicates a decrease in intensity and a 1 indicates an increase in intensity of a particular pixel. As a result, the events are transmitted at microsecond time resolution, equivalent to or better than conventional high-speed camera running at thousands of frames per second. That is, instead of wastefully sending entire images at fixed frame rates, in applications of concern to the invention, the DVS only transmits the local pixel-level changes caused by movement of the sensor at the time the events occur.

In U.S. 20150160737, "Apparatus and method for recognizing gesture using sensor," 2015, a dynamic vision sensor (DVS) is used for gesture recognition. In U.S. 20140354537, "Apparatus and method for processing user input using motion of object," 2014, a DVS is used for tracking moving objects. Conventional procedures, such as optical flow have been developed for DVS, see EP 2795580, "Method of estimating optical flow on the basis of an asynchronous light sensor," 2014.

Some methods extend visual odometry to DVS using a conventional camera, see Censi et al., "Low-latency event-based visual odometry," ICRA, 2014. Censi et al., disclose a visual odometry procedure used with a DVS and a complementary metal-oxide semiconductor (CMOS) camera. A novel calibration procedure performs spatio-temporal calibration of the DVS and the CMOS camera. Their approach estimates the relative motion of the DVS events with respect to a previous CMOS frame. The method is accurate for rotation estimates, whereas translation measurements tend to be noisy.

SLAM techniques and 3D reconstruction methods have also been developed for DVS, see Weikersdorfer et al., "Simultaneous localization and mapping for event-based vision systems," Computer Vision Systems, 2013, and Carneiro et al., "Event-based 3D reconstruction from neuromorphic retinas," Neural Networks, 2013. The Lucas-Kanade tracking procedure for optical flow estimation has been extended for the DVS. Certain registration methods, such as iterative-closest-point (ICP), have been extended for DVS to control micro-grippers. DVS can also be useful for evasive maneuvering of quadrotors. A pair of DVS can be used as a stereo camera for reconstructing objects near a quadrotor for predicting and avoiding collisions.

In the case of asynchronous DVS, the concept of epipolar geometry cannot be directly used. Epipolar geometry provides a relationship between corresponding points in a pair of images acquired from different viewpoints. Recently, a general version of epipolar geometry applicable for asynchronous event-based stereo-configuration has been developed, see Benosman et al., "Asynchronous event-based Hebbian epipolar geometry," IEEE Trans. Neural Network, 2011.

The stereo-matching can be done using event histograms and estimated depths can be used for gesture recognition. Beyond stereo, some methods use more than two event sensors for 3D reconstruction.

DVS-based solutions are also known for particle-filter based localization and mapping. It is possible to build a mosaic of a scene solely using a DVS without any additional sensors. This is achieved by tracking the sensor motion and using the estimated motion for registering and integrating the data.

However, as a drawback, the cost of a typical DVS is in the range of several thousand dollars.

SUMMARY OF THE INVENTION

The embodiments of the invention provide a method and system for localization and tracking using a sensor acquiring scene data. The invention provides two main embodiments. For low speed applications and a low cost system, the sensor can be a conventional camera. For high speed application, a dynamic visual sensor (DVS) can be used, although the cost of such a sensor can be two orders of magnitude higher than that of a camera, which can be below $20.

With the DVS, events are usually signaled for pixels with large temporal gradients. The temporal gradients are typically generated by edges in the scene (high spatial gradients) as the sensor moves with respect to the scene. The embodiments use a fast spatio-temporal binning scheme to detect 2D lines from these events associated with vertical edges. A 3D model of the scene contains 3D vertical edges associated with some of the 2D lines observed in the scene data. Establishing the correct 2D line to 3D edge correspondence allows localization of the sensor to the 3D model.

The embodiments provide an accurate absolute pose estimation method using a sensor. In particular, we represent a real world scene with an edge-based 3D model and localize the sensor by matching the 2D lines obtained from the scene data with the 3D lines of the 3D scene model.

DETAILED DESCRIPTION OF THE PREFERRED EMBODIMENTS

Figure 1:
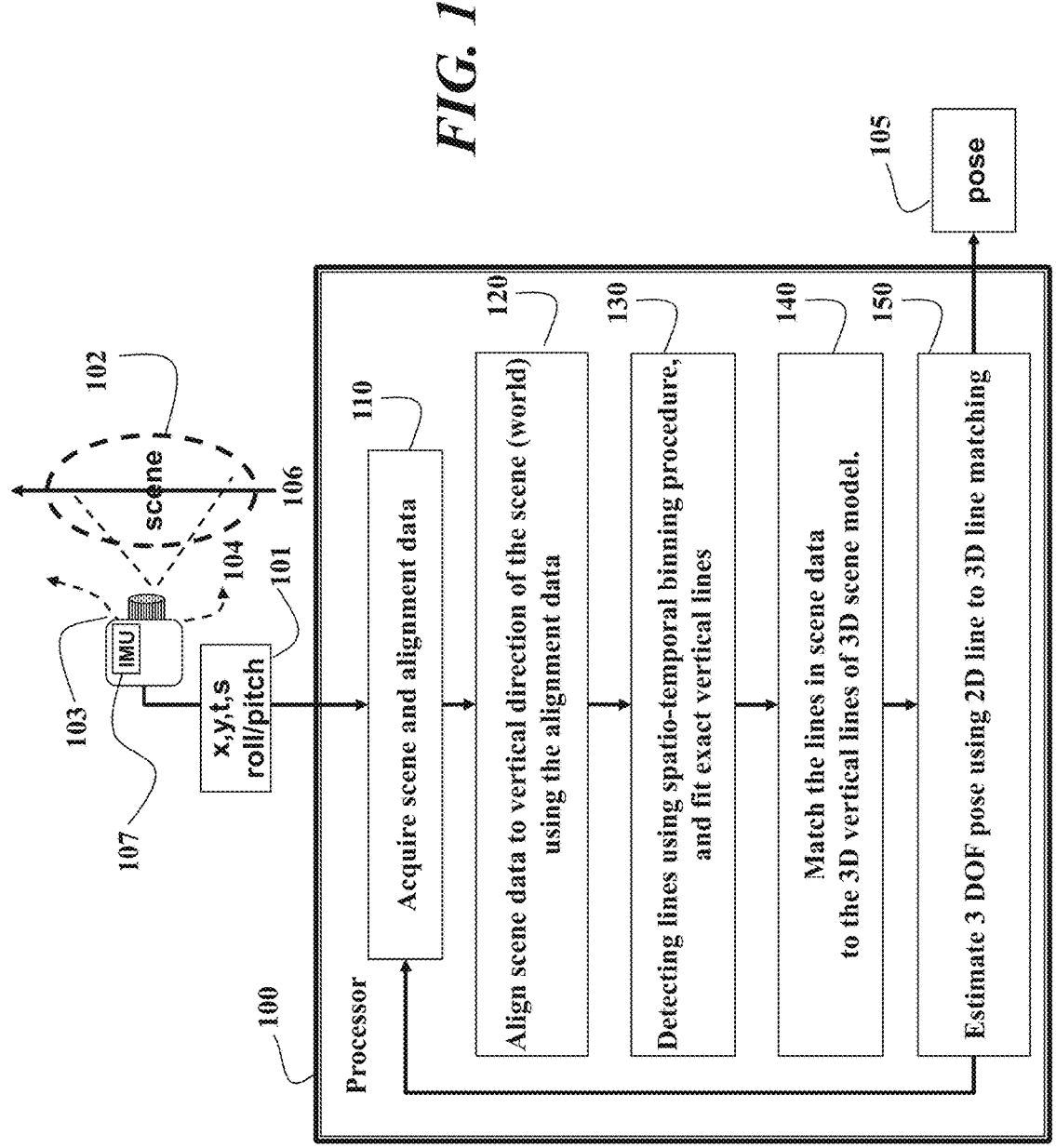
FIG. 1 is a schematic of a method and system for estimating a pose of a sensor according to embodiments of the invention.

The embodiments of our invention provide a method and system for estimating a pose of a sensor. The sensor can be either camera or an event sensor, such as a digital vision sensor, which only signals events when pixels sense a change in intensity, either a decrease or an increase. Such pixels are usually associated with large gradients, such as edges in the world as the sensor is moved.

In order to achieve a fast response, the invention focusses on real world scenes with strong features corresponding to, e.g., 3D vertical lines. The method can detect the vertical lines using a spatio-temporal binning scheme.

The pose estimation method uses correspondences between (2D) lines obtained from the scene data and three-dimensional (3D) lines in the world as represented in a scene model.

An inertial measurement unit (IMU) measures absolute roll and pitch angles to align the scene data with the vertical direction in the real world scene.

To the best of our knowledge, the vertical line-based pose estimation problem described herein has not been solved in the context of conventional frame-based sensors and cameras, and digital vision sensors.

Dynamic Vision Sensor

An example event sensor is an iniLabs DAVIS 240B dynamic vision sensor (DVS). This sensor includes an active pixel sensor (APS) circuit, (DVS) circuits, and an IMU on a single board. The APS and DVS circuits within a pixel share a single photodiode. The resolution of the APS frame is 240×180 pixels and dimensions of the scene data are 190×180. The APS frame rate is 23 Hz, and the IMU operates at 2300 Hz. The IMU provides alignment data, e.g., acceleration and angular velocity in six dimensions. The APS data can be used to visualize the results. We rely on the IMU data to align the scene data with the vertical direction in the real world scene.

The DVS signals pixel-level intensity changes using binary states. Each pixel asynchronously emits an ON event if a log-compressed intensity increases by a predetermined amount, and an OFF event when the intensity decreases. An event E is noted as tuple <x, y, t, s > where (x, y) is the pixel location, t is the time, and s is the event state: 1 for ON and 0 for OFF. The sensor can generate on the order of a million events per second.

It is understood that the sensor can be a conventional camera, or video camera because the camera can emulate the event sensor, albeit at the slower frame rate of the camera. Such an emulation can be performed by taking a difference between successive frames and classifying the difference at each pixel as an event or non-event based on a magnitude of the difference. Differences within some threshold distance from 0 are considered non-events. Differences that are greater than the threshold are positive events and are coded as <x, y, 1>, where (x, y) are the pixels coordinates. Differences that are smaller than the threshold are coded as <x, y, 0>. Since the camera frame rate is relatively slow compared to the frame rate of the DVS, events are naturally grouped on a frame by frame basis and there is no need to retain the temporal variable of the frame number, although this can be done for a complete analogy to the DVS.

Pose Estimation Method

As shown in FIG. 1, the method concurrently acquires 110 data 101 that includes scene data (x, y, t, s) of a scene 102 by the event sensor 103 and alignment data by the IMU 107. The alignment data can be used to determine roll and pitch of the event sensor 103 with respect to the scene. The scene data are aligned 120 to a vertical direction 106 of the scene to produce aligned scene data using the alignment data. Then, 2D vertical lines are detected 130 in the aligned scene data. The detecting fits the 2D lines in a spatial domain by fitting planes to the events data in a spatio-temporal domain.

The 2D vertical lines are matched 140 to vertical lines in the 3D model of the scene to produce matching lines. The pose 105 can then be estimated 150 from the matching lines. The steps, which can be performed in a processor 100 connected to the sensor and memory as known in the art, can be repeated while the sensor moves 104 to different viewpoints and poses. In the case wherein the sensor is moving, the method estimates a trajectory of poses for the event sensor at multiple viewpoints. The trajectory can be smoothed with a Kalman filter.

We use vertical lines as the feature to estimate the pose 105 of the 103 sensor given a 3D (world) model of the scene. By ignoring height, the 6 degree-of-freedom (DOF) localization problem is simplified to a 3 DOF problem. The 3 DOF (planar location and yaw) is more important in localization of vehicles and mobile robots, while the remaining variables (height, roll, pitch) can be obtained using the IMU, and other ways. Detecting only the vertical lines also make the feature extraction much faster than finding all lines with different orientations.

Sensor Alignment using IMU

The IMU alignment data are used to align 120 the scene data to a vertical direction in the (world) scene. This ensures that the sensed 2D lines correspond to real vertical lines in the scene, regardless of the sensor's pose. The IMU gyroscope can have large and time-dependent drift. Therefore, we apply an attitude heading reference (AHRS) procedure to obtain the sensor's attitude in the world coordinate system, see Mahony et al., "Nonlinear complementary filters on the special orthogonal group," Automatic Control, IEEE Transactions on, 53(5):1203-1218, 2008. Because the accelerometer only measures the gravity vector, the IMU cannot obtain a precise yaw angle. Therefore, we only use the roll and pitch angles from the IMU.

Based on the attitude measured by IMU, we use R to denote a rotation offset to align the sensor's vertical view and the world's vertical direction. The relation between the pixel p' (x', y') in the aligned scene data and a location p(x, y) in the acquired scene data is $$\begin{pmatrix} x' \\ y' \\ 1 \end{pmatrix} = sKRK^{-1} \begin{pmatrix} x \\ y \\ 1 \end{pmatrix}, \qquad (1)$$

where K is a matrix of intrinsic parameters for the sensor, and s is a scale factor that denotes that the relation is up to a scale.

Figure 2:
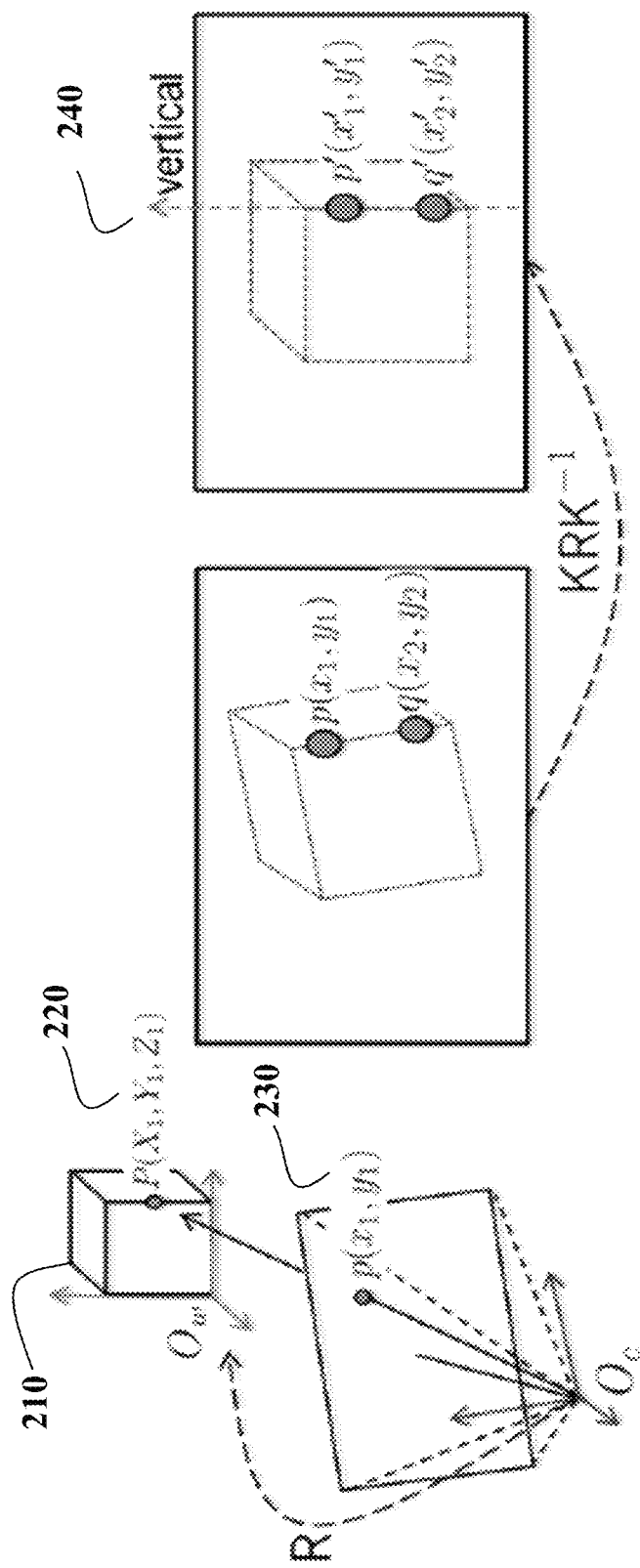
FIG. 2 is a schematic of sensor alignment according to embodiments of the invention.

FIG. 2 shows the alignment diagramatically. On the left, we show the sensor acquiring an image of a cube 210. The 3D point P ($X_1$, $Y_1$, $Z_1$) 220 is projected on to an image pixel p($x_1$, $y_1$) 230. We use the cube to denote that the world coordinate system, with respect to which the sensor, is slightly rotated. Using the IMU, we determine the rotation offset R between the camera coordinate system (with an origin $O_c$,) and the world coordinate systems (with an origin $O_w$,) on the roll and pitch axes. On the right, we show the image correction using the rotation offset R and the calibration matrix. Let p ($x_1$, $y_1$) and p' ($x'_1$, $y'_1$) denote the pixels before and after the alignment, respectively. As can be seen, two pixels p' ($x'_1$, $y'_1$) and q' ($x'_2$, $y'_2$) are aligned on the vertical axis 240 having $x'_1$=$x'_2$ after the alignment.

Line-Detection using Spatio-Temporal Binning

We use a voting procedure based on pixel locations of the events and the associated times to detect 130 lines in the aligned scene data using a spatio-temporal binning procedure. The procedure is based on the fact that pixels on the same vertical line or edge have similar x coordinate, and similar intensity contrast.

Figure 3:
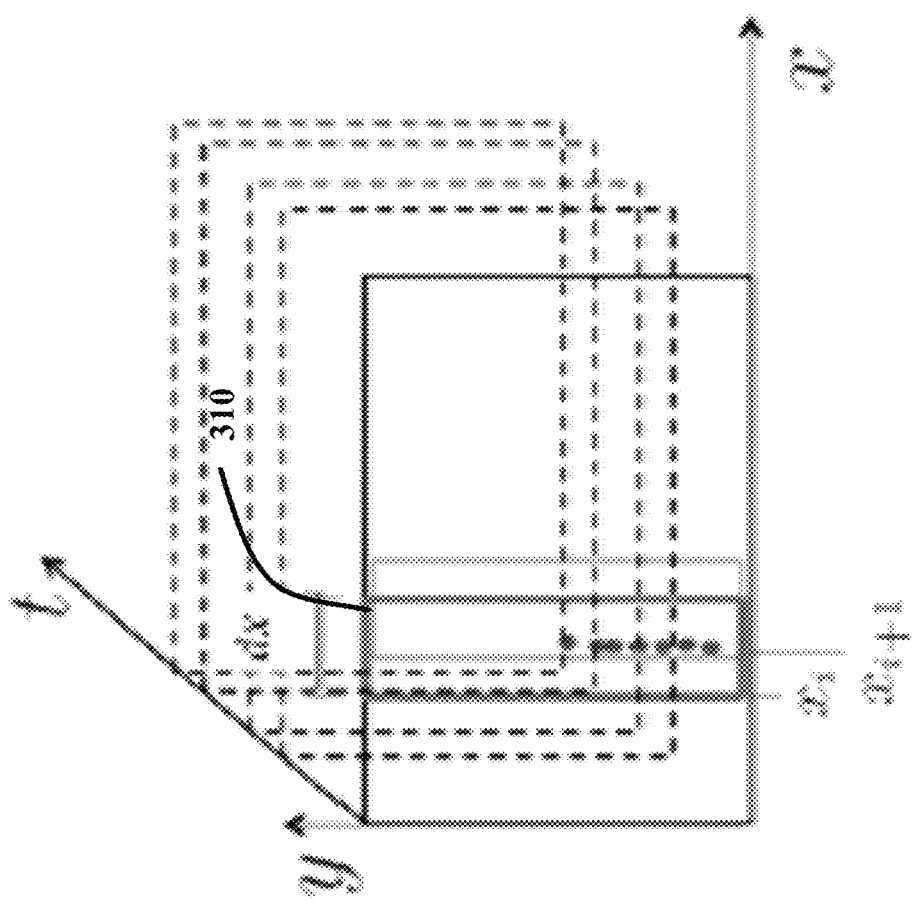
FIG. 3 is a schematic of spatio-temporal binning according to embodiments of the invention.

As shown in FIG. 3, we use a thin strip bin $V_{dx}(x_i)$ 310 to represent a rectangular area of pixels from $(x_i, 1)$ to $(x_i+dx, y_{max})$. The intensity contrast of an edge in the world is closely related to a time interval when multiple events are signaled for the same pixel. This is because the same world edge causes multiple events at the same pixel during sensor motion, and thus pixels on high-contrast edges cause more events within the same time interval. This implies that the time interval $\Delta t$ between two events signaled for the same location is shorter for high-constrast edges. We use a bin $V_{dx,dt}(x_i, \Delta t_j)$ to denote the pixels that are within $V_{dx}(x_i)$ and has a signaling interval between $\Delta t_j$ and $\Delta t_j+dt$.

As shown in FIG. 3, we preset overlapping sets of spatial intervals, and we consider a bin to contain a line when the bin has a number of events greater than a predetermined threshold, which is a local maximum with respect to nearby bins. In particular, we ensure that we select a bin $V_{dx,dt}(X_i, \Delta t_j)$ when the following conditions are satisfied:

1. Spatial neighboring pixels have fewer votes as given by the following constraints:

$V_{dx,dt}(x_i, \Delta t_j) > V_{dx,dt}(x_{i\pm 1}, \Delta t_j) + T_1$, and $V_{dx,dt}(x_i, \Delta t_j) > V_{dx,dt}(x_{i\pm 2}, \Delta t_j) + T_2$.

2. There is no other bin $V_{dx,dt}(x_i, \Delta t_j)$ satisfying the above threshold conditions when $\Delta t_k < \Delta t_k$.

After the bins are selected, we use least square procedure to fit the lines with the events in the bins, to account for any error in IMU-based alignment.

Pose Estimation using Vertical Lines

We make use of the IMU to obtain the vertical real world direction 106, and thus solve a 3-point pose estimation problem for recovering three unknown motion parameters, i.e., two translation parameters and one rotational angle. After we recover the 3 DOF, we have the five unknown motion parameters out of the total of six unknowns. If the sixth parameter (height=Y) is required, we can easily recover the height using any non-vertical line.

The focus of the invention is to extract the three important motion parameters (X, Z, and yaw) that enable us to localize and track the sensor with respect to a scene with dominant vertical structures.

Line Projections

Figure 4:
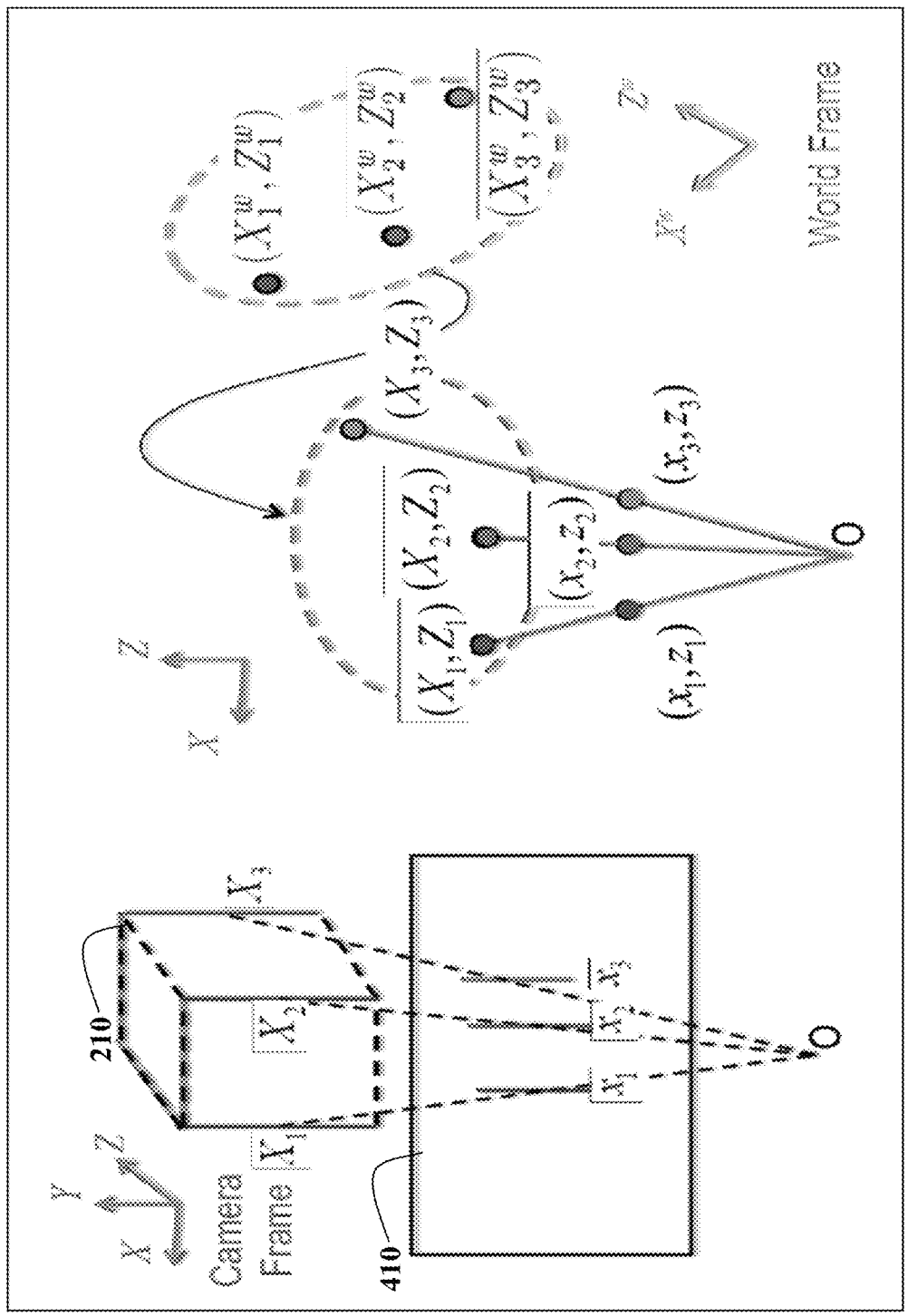
FIG. 4 is a schematic of a projection of three 3D points to three 2D points on a plane for the task of estimating the pose.

FIG. 4 schematically shows the projection of three 3D points to three 2D points on a plane. On the left, we show the projection of lines from the cube 210 to an image plane 410. On the right, we show the top view of the projection where vertical lines in the scene are denoted by 2D points $(X_1, Z_1)$, $(X_2, Z_2)$, $(X_3, Z_3)$, and vertical lines in the image (scene data) are denoted by 2D points $(x_1, z_1)$, $(x_2, z_2)$, $(x_3, z_3)$ and the origin is denoted by O.

The 3D points in the world coordinate system $(X_1^w, Z_1^w)$, $(X_2^w, Z_2^w)$, $(X_3^w, Z_3^w)$ can be transferred to the sensor coordinate system using a transformation (R, t).

As shown in FIG. 4, the transformation between a vertical line in the scene and the corresponding 2D line in the image (scene data) is given by $$\begin{pmatrix} x_i \\ z_i \end{pmatrix} = s_i \begin{pmatrix} \cos\theta & -\sin\theta & T_x \\ \sin\theta & \cos\theta & T_z \end{pmatrix} \begin{pmatrix} X_i^w \\ Z_i^w \\ 1 \end{pmatrix}. \quad (2)$$

We rearrange Eqn. (2), eliminate the scale variable $s_i$ and stack the equations for three 3D to 2D correspondences to obtain a linear system AX=0, where A and X are $$A = \begin{pmatrix} z_1 & -x_1 & (-z_1 Z_1^w - x_1 X_1^w) & (z_1 X_1^w - x_1 Z_1^w) \\ z_2 & -x_2 & (-z_2 Z_2^w - x_2 X_2^w) & (z_2 X_2^w - x_2 Z_2^w) \\ & & \vdots & \end{pmatrix}, \text{ and} \quad (3)$$

$$X = \begin{pmatrix} T_x \\ T_z \\ \sin\theta \\ \cos\theta \end{pmatrix}. \quad (4)$$

With three lines, the solution typically is unique. Using the reduced row-echelon form, we obtain the following linear system from the above equation:

$$\begin{pmatrix} 1 & 0 & 0 & \alpha \\ 0 & 1 & 0 & \beta \\ 0 & 0 & 1 & \gamma \end{pmatrix} \begin{pmatrix} T_x \\ T_z \\ \sin\theta \\ \cos\theta \end{pmatrix} = \begin{pmatrix} 0 \\ 0 \\ 0 \\ 0 \end{pmatrix}, \quad (5)$$

where $\alpha$, $\beta$ and $\gamma$ are constants obtained while determining the reduced row echelon form for the matrix A.

Using the above linear system, we determine the three unknown motion parameters $\theta$, $T_x$ and $T_z$ as follows:

$\theta = \tan^{-1}(-\gamma)$, $T_x = -\alpha \cos(\tan^{-1}(-\gamma))$, $T_z = -\beta \cos(\tan^{-1}(-\gamma))$.

Given a set of n 2D to 3D line correspondences, where n is greater than or equal to three, we can form a linear system AX=0 using all correspondences and solve the motion variables using a least squares procedure.

Our method uses two modules. When we do not have a reliable previous pose, we localize the sensor using a complete search for 2D to 3D line correspondences. When we have a previous pose, the 2D to 3D line correspondences are known, and we only need to update the position for small changes. The complete search for localization takes more time than the update.

As described above, a conventional camera can emulate a DVS. However such an emulation is not necessary for application of our method. Lines can be extracted directly from a single camera image by 2D edge extraction, and the restriction to vertical lines on the basis of IMU data allows fast pose estimation.

Correspondence Search

The pose estimation requires 2D to 3D line correspondences. The correspondence search is very difficult because of many factors, such as repetitive scene geometry, noisy scene data, missing and spurious lines in the line detection, and incorrect modeling of the world. One obvious solution is to consider all possible matches and pick the best matches based on some error criteria. However, this strategy can be fail even for as few as 20 lines.

In order to solve the search problem, we use a grid-search method that uses constraints based on an angle between viewing directions of lines. In this case, searching the best correspondence means finding a largest set of correspondences with a minimal matching cost determined using reprojection errors for all the line correspondences.

Reprojection Error

Using the estimated poses, we reproject the 3D lines to the image and measure the reprojection error, i.e., a distance between the pixel associated with the event and the reprojected 3D line. The reprojection error for the pose estimation is generally less than two pixels, indicating that the pose estimates are accurate.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for estimating a three-dimensional (3D) pose of a sensor, comprising steps:
   acquiring scene data of a 3D scene by the sensor;
   acquiring alignment data for the sensor using an inertial measuring unit (IMU), wherein the alignment data includes roll and pitch angles of the sensor; and
   aligning the scene data to a vertical direction of the scene using the alignment data;
   determining a rotation offset R from the alignment data, wherein a relation between a pixel p'(x', y') in the scene data after the aligning and a location p (x , y) in the scene data is where K is a matrix of intrinsic parameters for the event sensor, and s is a scale factor that denotes that the relation is up to a scale;
   detecting two-dimensional (2D) lines in the scene data using spatio-temporal binning and a voting procedure;
   matching the 2D lines to 3D lines of a 3D model of the scene to produce matching lines at least three; and
   estimating the 3D pose of the sensor using the matching lines by solving a linear system formed by 2D to 3D correspondences defined by the three matching lines, wherein the sensor is a camera, and the 2D lines and the 3D are vertical lines, such that the estimation of the 3D pose of the sensor includes using correspondences between the 2D lines obtained from the scene data and the 3D lines in the scene as represented in the 3D model, and wherein the steps are performed in a processor.

2. The method of claim 1, wherein the scene data includes pixels, and wherein the detecting further comprises:
   fitting the 2D lines in a spatial domain to the pixels with high spatial gradients.

3. The method of claim 2, wherein the 2D lines are fitted using a least square procedure.

4. The method of claim 1, further comprising:
   applying an attitude heading reference (AHRS) procedure to obtain an attitude of the sensor in a world coordinate system.

5. The method of claim 1, wherein detecting the 2D lines uses spatio-temporal binning and a voting procedure.

6. The method of claim 1, wherein a minimum of three 2D lines and three 3D lines are used for the estimating.

7. The method of claim 1, wherein the detecting further comprises:
   fitting the 2D lines in a spatial domain by fitting planes to the scene data in a spatio-temporal domain.

8. The method of claim 1, wherein event data are <x, y, t, s> where (x, y) is a location of a pixel in the scene data, t is a time, and s is a state, where 0 indicates a decrease in an intensity of the pixel and 1 indicates an increase in the intensity of the pixel.

9. A system for estimating a three-dimensional (3D) pose, comprising:
   a sensor configured to acquire scene data of a 3D scene;
   an inertial measuring unit (IMU) configured to acquire alignment data for the sensor, wherein the alignment data includes roll and pitch angles of the sensor;
   a processor, connected to the sensor, configured to determine a rotation offset R from the alignment data and wherein a relation between a pixel p'(x', y') in the scene data after the aligning and a location p(x, y) in the scene data is $$\begin{pmatrix} x' \\ y' \\ 1 \end{pmatrix} = sKRK^{-1} \begin{pmatrix} x \\ y \\ 1 \end{pmatrix},$$

where K is a matrix of intrinsic parameters for the event sensor, and s is a scale factor that denotes that the relation is up to a scale, align the scene data to a vertical direction of the scene using the alignment data, detect a minimum of three two-dimensional (2D) lines and a minimum of three 3D lines in the scene data, and to match the 2D lines to 3D lines of a 3D model of the scene to produce matching lines, and to estimate the 3D pose of the sensor using the matching lines, wherein the sensor is a camera and the 2D lines and the 3D lines are vertical lines.

10. The system of claim 9, wherein the sensor is a digital vision sensor.

11. A method for estimating a three-dimensional (3D) pose of a sensor, comprising steps:
   acquiring scene data of a 3D scene by the sensor;
   acquiring alignment data for the sensor using an inertial measuring unit (IMU), wherein the alignment data includes roll and pitch angles of the sensor; and
   aligning the scene data to a vertical direction of the scene using the alignment data;
   determining a rotation offset R from the alignment data, wherein a relation between a pixel p'(x', y') in the scene data after the aligning and a location p(x , y) in the scene data is $$\begin{pmatrix} x' \\ y' \\ 1 \end{pmatrix} = sKRK^{-1} \begin{pmatrix} x \\ y \\ 1 \end{pmatrix},$$

where K is a matrix of intrinsic parameters for the event sensor, and s is a scale factor that denotes that the relation is up to a scale;
   detecting two-dimensional (2D) lines in the scene data;
   matching the 2D lines to 3D lines of a 3D model of the scene to produce matching lines; and
   estimating the 3D pose of the sensor using the matching lines, wherein the sensor is a camera, and the 2D lines and the 3D are vertical lines, and wherein the steps are performed in a processor.

* * * * *